No. 782,126. PATENTED FEB. 7, 1905.
C. B. GILMORE.
CORN POPPER.
APPLICATION FILED OCT. 10, 1903.
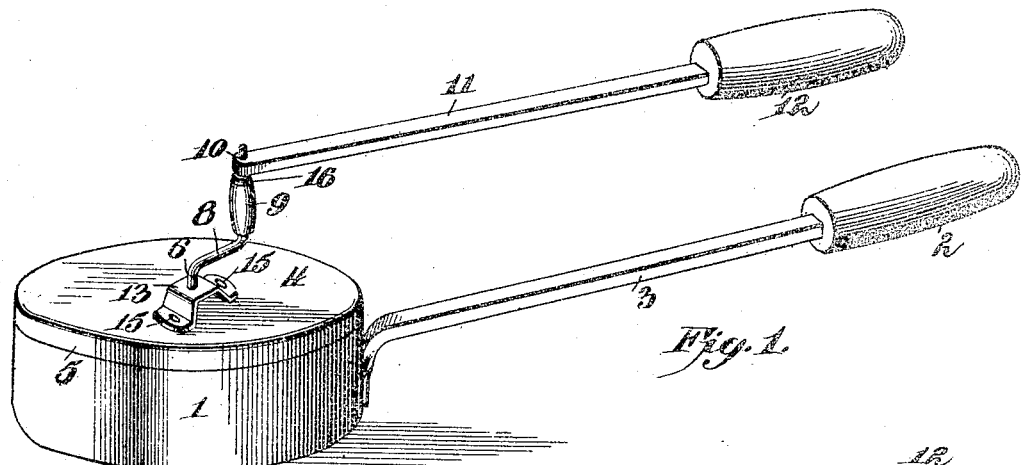
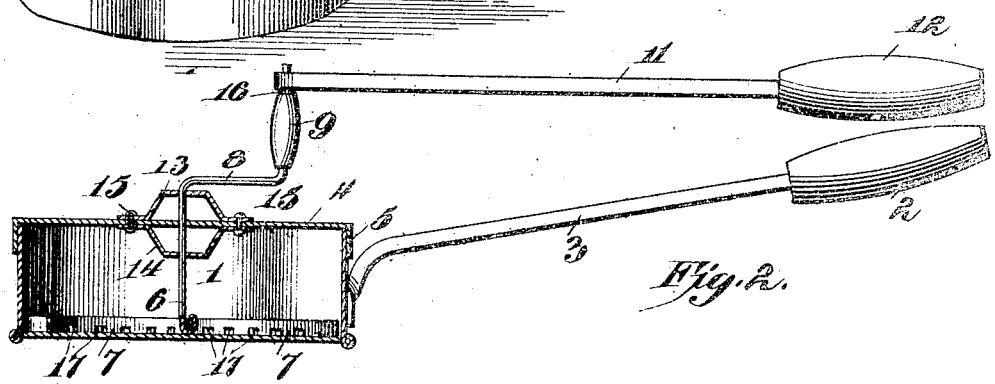
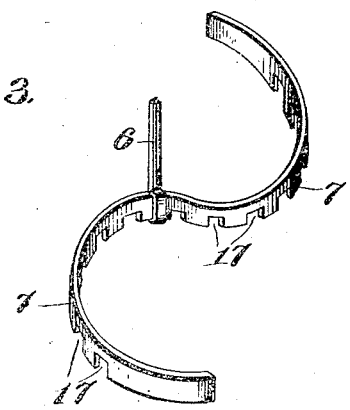
Charles B. Gilmore, Inventor No. 782,126.

Patented February 7, 1905.

UNITED STATES PATENT OFFICE.

CHARLES B. GILMORE, OF BLOOMINGTON, ILLINOIS.

CORN-POPPER.

SPECIFICATION forming part of Letters Patent No. 782,126, dated February 7, 1905.

Application filed October 10, 1903. Serial No. 176,539.

*To all whom it may concern:*

Be it known that I, CHARLES B. GILMORE, a citizen of the United States, residing at Bloomington, in the county of McLean and State of Illinois, have invented a new and useful Corn-Popper, of which the following is a specification.

The invention relates to improvements in corn-poppers.

The object of the present invention is to improve the construction of corn-poppers, and to provide a simple, inexpensive, and efficient one of great strength and durability designed for use over the hole of an ordinary cooking-stove or in connection with any other desired heater and adapted for evenly heating corn for popping the same and capable also for use as a cooking utensil where it is necessary or desirable to stir the contents of a receptacle continuously or at intervals to prevent the same from scorching or burning.

A further object of the invention is to provide a device of this character which will be capable of continuously agitating the corn and of moving the unpopped grains toward the center where the heat is the greatest and which will prevent the popped corn from scorching or burning, thereby obviating the necessity of removing the contents of the corn until the same has been completely popped.

Another object of the invention is to provide a corn-popper which will also be adapted for stirring the seasoning, such as butter and salt, with the corn, thereby thoroughly mixing the same.

Furthermore, it is the object of the invention to provide a corn-popper which will enable the operator to stand away from the fire or other form of heater and at the same time operate the corn-popper advantageously.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a corn-popper constructed in accordance with this invention. Fig. 2 is a longitudinal sectional view. Fig. 3 is a detail perspective view of the stirring-arms.

Like numerals of reference designate corresponding parts in all the figures of the drawings.

1 designates a cylindrical receptacle designed to be of a size to fit over the hole of an ordinary cooking-stove; but the receptacle may be constructed of any desired size to adapt it for the character of heater with which it is to be used. The receptacle, which may be constructed or any suitable material, is provided with a handle 2, having an elongated shank of bar 3 to enable the operator to stand a considerable distance from the receptacle, so as not to be inconvenienced by the heat. The shank or bar 3 of the handle is preferably constructed of suitable metal and is riveted or otherwise secured to the receptacle. The handle 2 is constructed of wood or other suitable non-heat-conducting material.

The receptacle 1 is provided with a cover 4, having a depending flange 5 of sufficient depth to firmly embrace the body portion of the receptacle, whereby the cover is effectually prevented from becoming accidentally displaced and is enabled to support the stirring mechanism hereinafter described. The cover is centrally pierced by a vertical shaft 6, which carries opposite stirring-arms 7 and which is provided at its upper end with a crank 8, having a grip or handle 9 and adapted to receive an eye 10 of the shank or bar 11 of a handle 12. The shank or bar 11 is approximately the same length as the shank or bar 3 of the handle 2 to enable the crank to be operated at a convenient distance from the fire, and the handle 12 is constructed of non-heat-conducting material. The shaft is supported by upper and lower approximately U-shaped plates 13 and 14, located at the inner and outer faces of the cover and extending upward and downward therefrom and secured at their terminals to the cover by rivets 15, which pierce the cover and both of the bearing-plates. The terminals of the bearing-plates are bent outward and fitted against the upper and lower faces of the cover, as clearly shown in Fig. 2. The crank is extended above the grip or handle 9 and is provided at the upper end thereof with a washer 16, and the extended portion of the crank passes through the eye 10 of the shank or bar 11 of the handle 12, the washer 16 forming a support for the shank or bar. The shank or bar 11 is adapted to be readily placed on and removed from the extended portion of the crank, and the latter is also capable of being readily operated by the grip or handle 9.

The stirring-arms 7 consist of a strip or piece of metal bent into S shape and centrally secured to the lower end of the shaft; but instead of employing only two stirring-arms any other desired number may be provided, as will be readily understood. The curved horizontally-disposed stirring-arms which lie upon the bottom of the receptacle present concave front faces and are adapted to direct the grains of corn inward toward the center of the pan where the heat is the greatest, and they are also capable of agitating the popped corn to prevent the same from being scorched or burned. The stirring-arms will also permit the corn to flow over it, and in order to increase the agitation of the corn the stirring-arms are provided at intervals with lower recesses 17, which are of a size to permit the grains of unpopped corn to pass through them. By this construction the stirrer will direct the corn inward and will stir and agitate the same to prevent the corn from being scorched or burned and will also permit the corn to pass through it and over it. By this construction also the device forms an efficient cooking utensil and may be employed in general cooking for a variety of purposes where it is desirable to stir the contents either continuously or at intervals. The stirring-arms are also adapted for thoroughly mixing seasoning, such as salt and butter, with the corn while the same is being cooked, and the corn is uniformly heated, so that the popping practically takes place at the same time, thereby enabling the corn to be popped in the shortest possible time. The operator may permit the popper to remain over the fire until the last grain is popped without liability of burning any of the corn. The curved stirring-arms may be bent in either direction for constructing the corn-popper for rotation in either direction.

Having thus fully described my invention, what I claim as new, and desire to secure by Letters Patent, is—

1. A device of the class described, comprising a receptacle having a rigid handle, a cover fitted on the receptacle and provided with upper and lower oppositely-disposed approximately U-shaped bearing-plates, fastening devices piercing the cover and both of the bearing-plates, a shaft piercing the cover and journaled in the upper and lower bearing-plates and provided with an exterior crank composed of horizontal and vertical portions, a vertical grip or handle fitted on the vertical portion of the crank and terminating short of the upper end thereof, the extended portion of the crank forming a reduced journal, stirring means carried by the shaft, and a removable handle having an eye receiving the journal of the crank and supported by the grip or handle thereof, substantially as described.

2. A device of the class described provided with curved stirring-arms having imperforate outer portions and provided at their inner portions with openings or recesses, substantially as described.

In testimony that I claim the foregoing as my own I have hereto affixed my signature in the presence of two witnesses.

CHARLES B. GILMORE.

Witnesses:
 IRA F. GILMORE,
 IDA A. DONELSON.